(12) United States Patent
Makino

(10) Patent No.: US 11,310,556 B2
(45) Date of Patent: Apr. 19, 2022

(54) DISPLAY APPARATUS, DISPLAY CONTROL METHOD, AND STORAGE MEDIUM

(71) Applicant: CASIO COMPUTER CO., LTD., Tokyo (JP)

(72) Inventor: Tomoya Makino, Mitaka (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/437,116

(22) Filed: Jun. 11, 2019

(65) Prior Publication Data

US 2019/0394523 A1      Dec. 26, 2019

(30) Foreign Application Priority Data

Jun. 21, 2018   (JP) .............................. JP2018-117881

(51) Int. Cl.
*H04N 21/4363* (2011.01)
*H04N 21/235* (2011.01)

(52) U.S. Cl.
CPC ..... *H04N 21/43635* (2013.01); *H04N 21/235* (2013.01)

(58) Field of Classification Search
CPC ........... H04N 21/43635; H04N 21/235; H04N 21/4424; H04N 21/4367; H04N 21/43632; H04N 21/4122; H04N 21/4858; H04N 5/765; H04N 21/2347; H04N 21/4405
See application file for complete search history.

(56) References Cited

U.S. PATENT DOCUMENTS

2013/0111578 A1 *   5/2013   Okada ................... G09G 5/006
                                                          726/16

FOREIGN PATENT DOCUMENTS

JP      2013-191945       *   9/2013
JP      2013-191945   A       9/2013

* cited by examiner

*Primary Examiner* — Kunal Langhnoja
(74) *Attorney, Agent, or Firm* — Scully Scott Murphy & Presser

(57) ABSTRACT

There is provided a display apparatus which includes an input device having a plurality of video signal terminals including a digital video signal terminal, a display configured to display an input signal which is input from the input device, and a controller configured to set a search time of a digital video signal in accordance with presence or absence of power supply to a power supply terminal of the digital video signal terminal, and a connection status in a case in which the power supply is present, and configured to execute a search of the digital video signal in the search time.

9 Claims, 7 Drawing Sheets

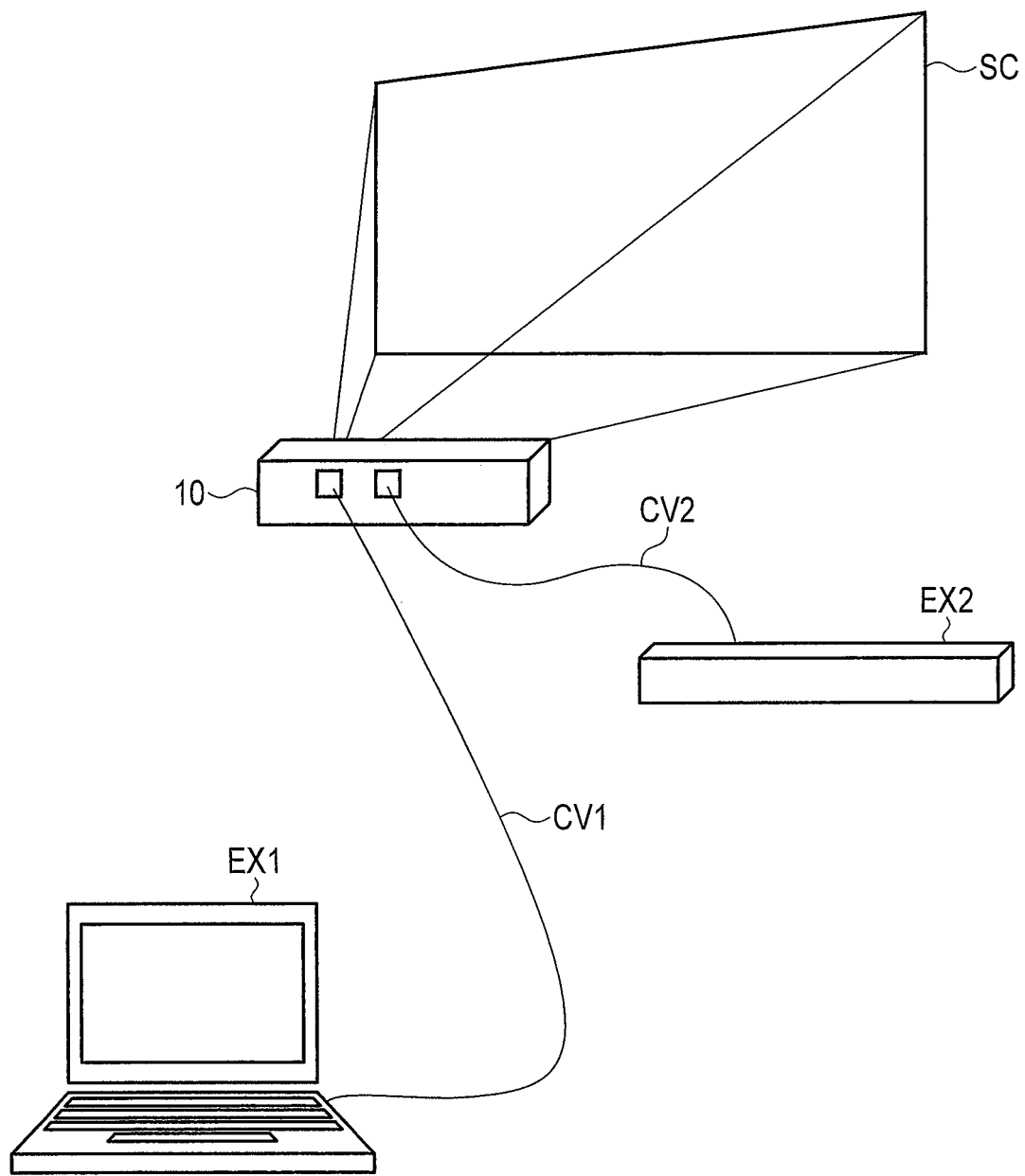
F I G. 1

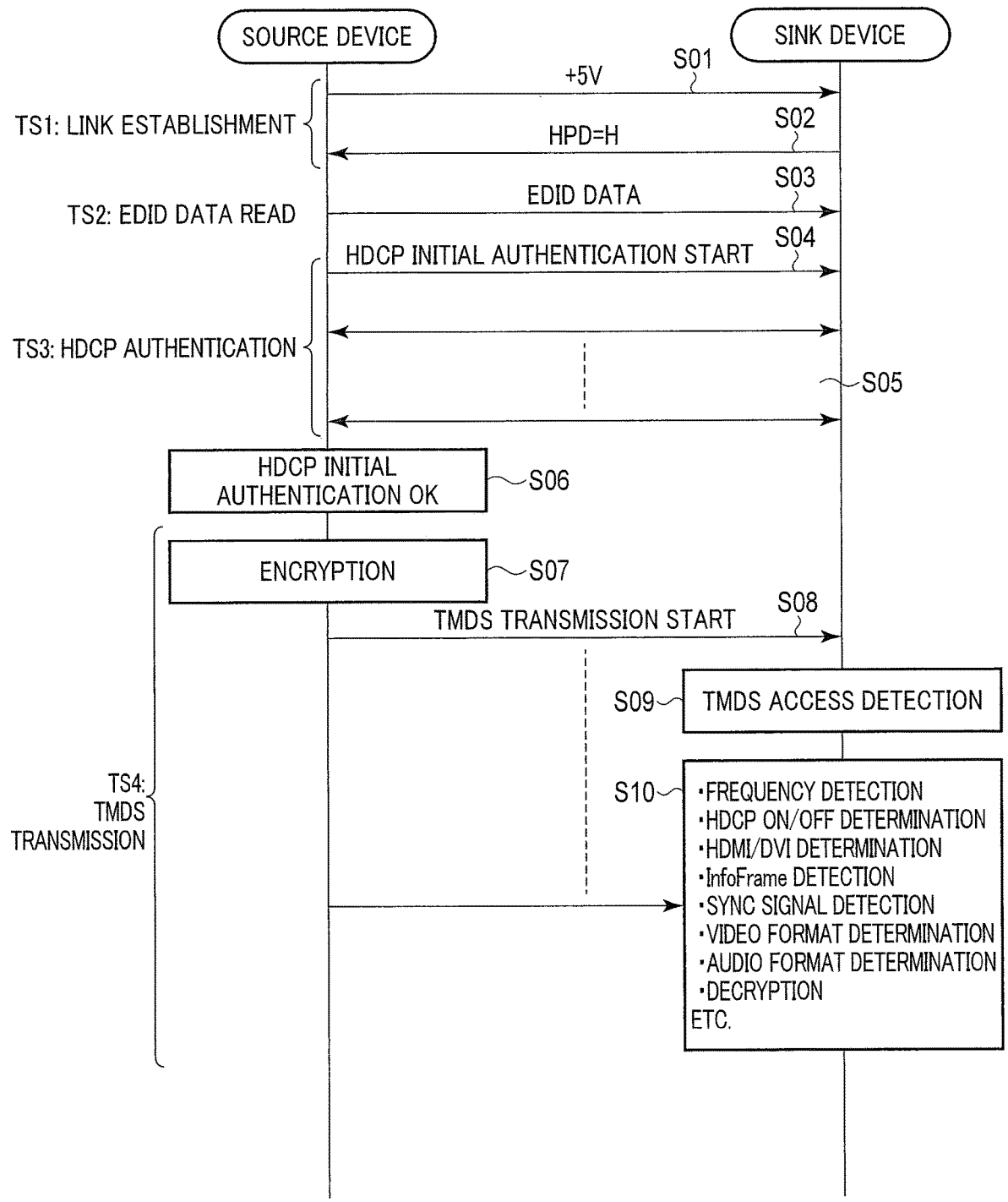
F I G. 7

DISPLAY APPARATUS, DISPLAY CONTROL METHOD, AND STORAGE MEDIUM

CROSS-REFERENCE TO RELATED APPLICATIONS

This application is based upon and claims the benefit of priority from Japanese Patent Application No. 2018-117881, filed Jun. 21, 2018, the entire contents of which are incorporated herein by reference.

BACKGROUND OF THE INVENTION

1. Field of the Invention

The present invention relates to a display apparatus to which a plurality of digital video signals can be input, a display control method, and a storage medium.

2. Description of the Related Art

Jpn. Pat. Appln. KOKAI Publication No. 2013-191945 proposes technology for enhancing the reliability of determination of the presence/absence of an image signal, while suppressing an increase in search time, even for external devices which are different in standby time from the confirmation of electrical connection to the output of an image signal.

In addition, Jpn. Pat. Appln. KOKAI Publication No. 2013-191945 describes technology which changes the setting of a predetermined time for determining the presence/absence of an input of an image signal at an HDMI (trademark) (High-Definition Multimedia Interface) terminal, according to whether power is supplied via the HDMI terminal.

In a projector apparatus, by a function generally called "auto search", the projector apparatus successively executes, in advance, searches for not only the HDMI signal but also various kinds of video signals which can be input to the projector apparatus.

FIG. 6 illustrates an example of a process in which searches are executed for video signals that are successively input to an RGB terminal, an HDMI terminal and a composite video terminal in the named order, and the presence of a video signal at the composite video terminal is detected, after which composite video projection is started.

In FIG. 6, if an auto search is started at timing t1, a signal search of the RGB terminal is first executed. At a time point (timing t2) when no input of an RGB signal is determined, a search for an HDMI signal is started subsequently (timing t3).

At a time point (timing t4) when no input of an HDMI signal is determined, a search for a composite video signal is then started (timing t5). Thereafter, at a time point (timing t6) when a composite video signal is detected, image projection using the composite video signal is started in accordance with the detection result (timing t7).

In addition, in particular, when a signal is input to the HDMI terminal, there is a case in which the time needed for transactions for connection between a source device on a side which supplies a video signal, such as a video disc player or a personal computer, and a sink device on a side which reproduces and outputs the supplied video signal, such as a TV receiver or a projector apparatus, is greatly different depending on devices.

FIG. 7 is a view illustrating an example of a connection sequence between a source device and a sink device from a search for an HDMI signal to the transmission of a video signal.

If the source device and the sink device are connected by an HDMI cable, a voltage of +5 [V] is applied from the source device to the sink device via a power line (step S01).

Upon detecting the voltage application, the sink device sets a hot plug detection line (HPD) at "H" level (step S202). Thereby, link establishment is executed (stage TS1).

Responding to this, the source device reads out EDID (Extended Display Identification Data) for inter-device authentication, and transmits the EDID to the sink device (step S03) (stage TS2).

The sink device includes therein the data (EDID) of the resolution that is supported. In order to enable automatic easy use by simple connection between the sink device and source device, the EDID is assembled in connection terminals of HDMI, DVI (Digital Visual Interface) and DisplayPort. Thereby, a recommended resolution, a refresh rate, etc. can be communicated between the sink device and source device via the cable.

Thereafter, initial authentication by HDCP (High-bandwidth Digital Content Protection) is started from the source device to the sink device (step S04). Further, transactions of data for the initial authentication are executed between both devices (step S05). When content is encrypted for a copy guard, HDCP authentication is needed.

Until the source device successfully obtains the initial authentication of HDCP (step S06), the process of the HDCP authentication is executed (stage TS3).

If the HDCP authentication is obtained, the source device starts encryption conforming to HDCP (step S07) and executes, as an actual video signal transmission process (stage TS4), the transmission by TMDS (Transition Minimized Differential Signaling) that is a transmission method used for transmitting a digital video signal.

In the process of the TMDS transmission, after the sink device first detects a TMDS access (step S09), the sink device executes, as needed, processes such as frequency detection, ON/OFF determination of HDCP, distinction determination between an HDMI signal and a DVI (Digital Visual Interface) signal, determination of InfoFlame, detection of a synchronization (sync) signal, determination of audio format, and decryption (step S10).

In this serial process that is first executed when the HDMI cable is connected, the period from the read of the EDID after the establishment of the link, to the subsequent HDCP authentication and to the transmission start of TMDS data varies greatly from source device to source device.

Specifically, the time that is needed until the source device actually outputs the video data greatly varies depending on devices, and it is possible that a difference of 4~5 [seconds] occurs depending on devices. When devices are relayed via a distributor, this time becomes longer.

Thus, in the above-described auto search function, in the case of a device with a slow signal output, it is highly possible that, before a video signal is output, the sink device determines that there is no video signal. As a result, it is possible that some source device cannot perform the video output by an HDMI signal by using the auto search function.

Conversely, it may be thought that a long time is set until determining the presence/absence of a video signal of each device at the time of the auto search function, in accordance with the source device with the slow video signal output. However, this setting is not practical, since a wasteful redundant time is consumed in the device with a fast video signal output until transitioning to projection.

The present invention has been made in consideration of the above circumstances, and the object of the invention is to provide a display apparatus which can properly set a time for determining the presence/absence of each of a plurality of video signals at a time of executing a search for the video signals, a display control method, and a storage medium.

SUMMARY OF THE INVENTION

According to one aspect of the present invention, there is provided a display apparatus comprising: an input device having a plurality of video signal terminals including a digital video signal terminal; a display configured to display an input signal which is input from the input device; and a controller configured to set a search time of a digital video signal in accordance with presence or absence of power supply to a power supply terminal of the digital video signal terminal, and a connection status in a case in which the power supply is present, and configured to execute a search of the digital video signal in the search time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view illustrating an installation environment of a projection system including a projector apparatus according to an embodiment of the present invention;

FIG. 7 is a view illustrating an example of a connection sequence between a source device and a sink device from a search for an HDMI signal to the transmission of a video signal.

DETAILED DESCRIPTION OF THE INVENTION

Hereinafter, referring to the accompanying drawings, a description is given of an embodiment in a case in which the present invention is applied to a projection system using a projector apparatus of a DLP (trademark) (Digital Light Processing) method.

FIG. 1 is a view illustrating an example of an installation environment of the projection system. In FIG. 1, a personal computer EX1 and a video disc player EX2 are connected to a projector apparatus 10 via cables CV1 and CV2.

It is assumed that, for example, any one of a VGA cable, an HDMI cable and a DisplayPort (trademark) cable for video signal transfer is used as the cable CV1 which connects the personal computer EX1 and projector apparatus 10.

In addition, it is assumed that an HDMI cable is used as the cable CV2 which connects the video disc player EX2 and projector apparatus 10.

At the start of the projection operation, the projector apparatus 10 executes a search for each of video signals from the personal computer EX1 and video disc player EX2 which are connected to the projector apparatus 10 via the cables CV1 and CV2. The projector apparatus 10 executes projection setup of video from the side from which the input of the video signal was determined, and then starts the projection operation and projects video onto a screen SC.

Figure 2:
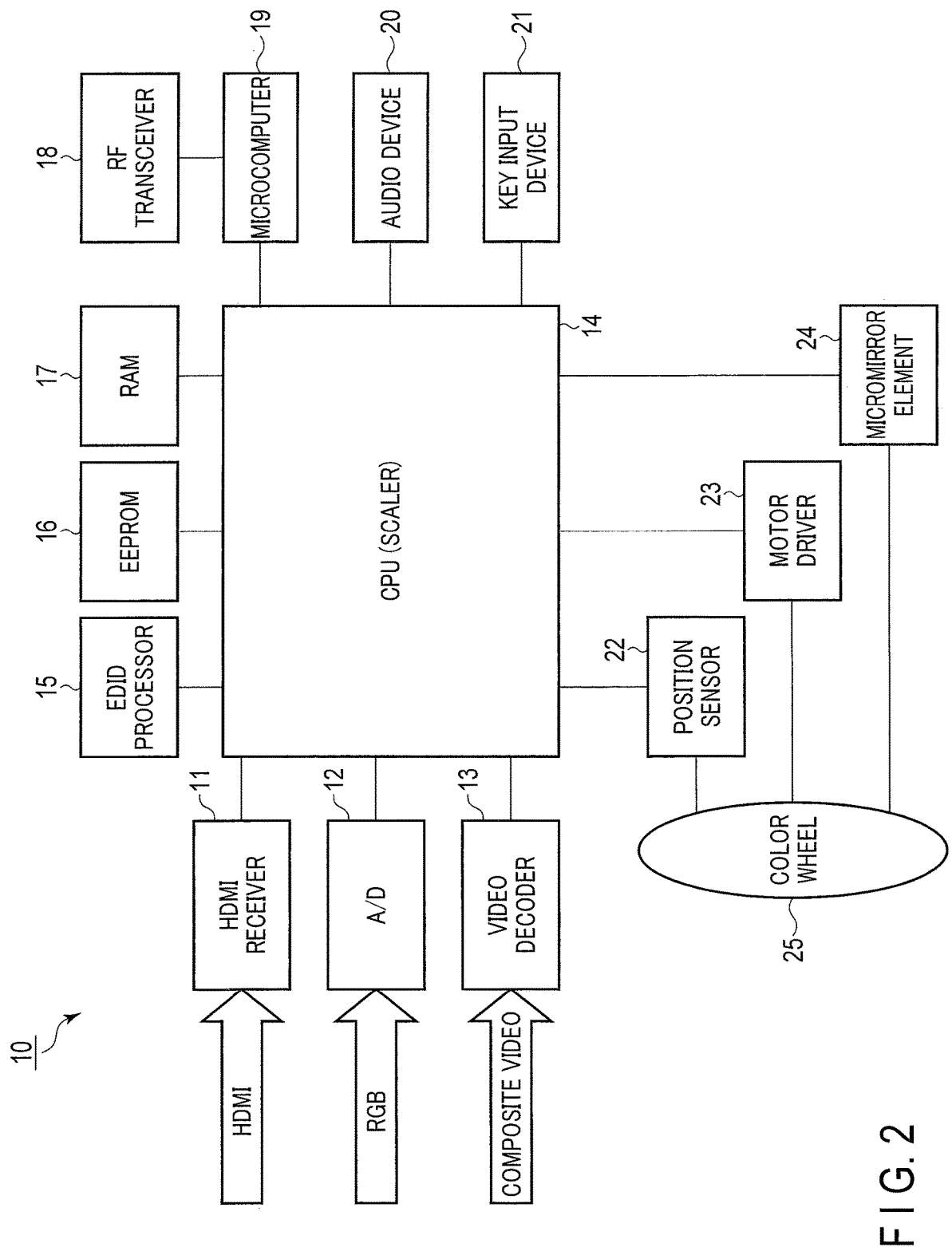
FIG. 2 is a block diagram illustrating a functional configuration of electronic circuitry of a projector according to the embodiment.

FIG. 2 is a block diagram illustrating a functional configuration of electronic circuitry of the projector apparatus 10.

An HDMI signal that is a digital video signal is input to an HDMI receiver 11 (a digital video signal terminal, an input device) via an HDMI terminal (not shown), an analog RGB signal is input to an A/D converter 12 (input device) via a VGA terminal (not shown), and a composite video signal that is also an analog signal is input to a video decoder 13 via an RCA pin jack terminal (not shown).

The HDMI receiver 11 decodes the HDMI signal and outputs the decoded signal to a CPU 14.

The A/D converter 12 converts the analog RGB signal to a digital signal, and outputs the digital signal to the CPU 14.

The video decoder (input device) 13 converts the composite video signal, which is a luminance/chrominance-type analog video signal, to a digital video signal of primary colors, and outputs the digital video signal to the CPU (a scaler, a controller) 14.

The CPU 14 functions as a so-called "scaler", which controls a projection operation under a predetermined projection condition, based on the video signals which are input from the HDMI receiver 11, A/D converter 12 and video decoder 13. The CPU 14 is connected to an EDID processor 15, an EEPROM (trademark) 16, a RAM 17, an RF transceiver 18, a microcomputer 19, an audio device 20, a key input device 21, a position sensor 22, a motor driver 23, and a micromirror element 24.

The EDID processor 15 executes an authentication process with an external device which is connected via the HDMI receiver 11.

The EEPROM 16 stores operation programs which the CPU 14 executes, and various fixed data, etc.

The RAM 17 functions as a work memory when the CPU 14 executes a control process.

The RF transceiver 18 executes transmission/reception of data to/from an external device which is wirelessly connected to the projector apparatus 10.

The microcomputer 19 comprehensively controls the operations of the entirety of the projector apparatus 10, other than the control of the projection operation by the CPU 14, including the transmission/reception of data by the RF transceiver 18.

The audio device 20 converts an audio signal, which is separated from the video signal, to an analog signal, and drives a loudspeaker (not shown) to produce sound.

The key input device 21 includes a key operation unit provided on the body housing of the projector apparatus 10, and a light receiving unit that receives an infrared modulation signal corresponding to a key operation from a remote controller dedicated to the projector apparatus 10, and sends a key operation signal to the CPU 14.

The position sensor 22 is a sensor which is disposed to be opposed to a rotational peripheral end portion of a color wheel 25 for emitting primary-color light in a time-division manner, and detects an approach of a position marker (not shown) that is provided on the color wheel 25, thereby detecting rotational synchronization of the color wheel 25.

The motor driver 23 drives a motor (not shown) which rotates the color wheel 25 in an identical direction at a fixed speed.

The micromirror element 24 executes a display operation by ON/OFF control of attitude inclination angles of many micromirrors which are arranged two-dimensionally. Primary-color light from the color wheel 25 is made incident on the micromirror element 24, and thereby a projection light image is formed from the reflective light. The projection light image is emitted toward the screen SC or the like of the projection target via a projection lens system (not shown). A display for displaying an image on the micromirror element 24 is provided with a display encoder and a display driver.

Next, the operation of the embodiment will be described.

Figure 3:
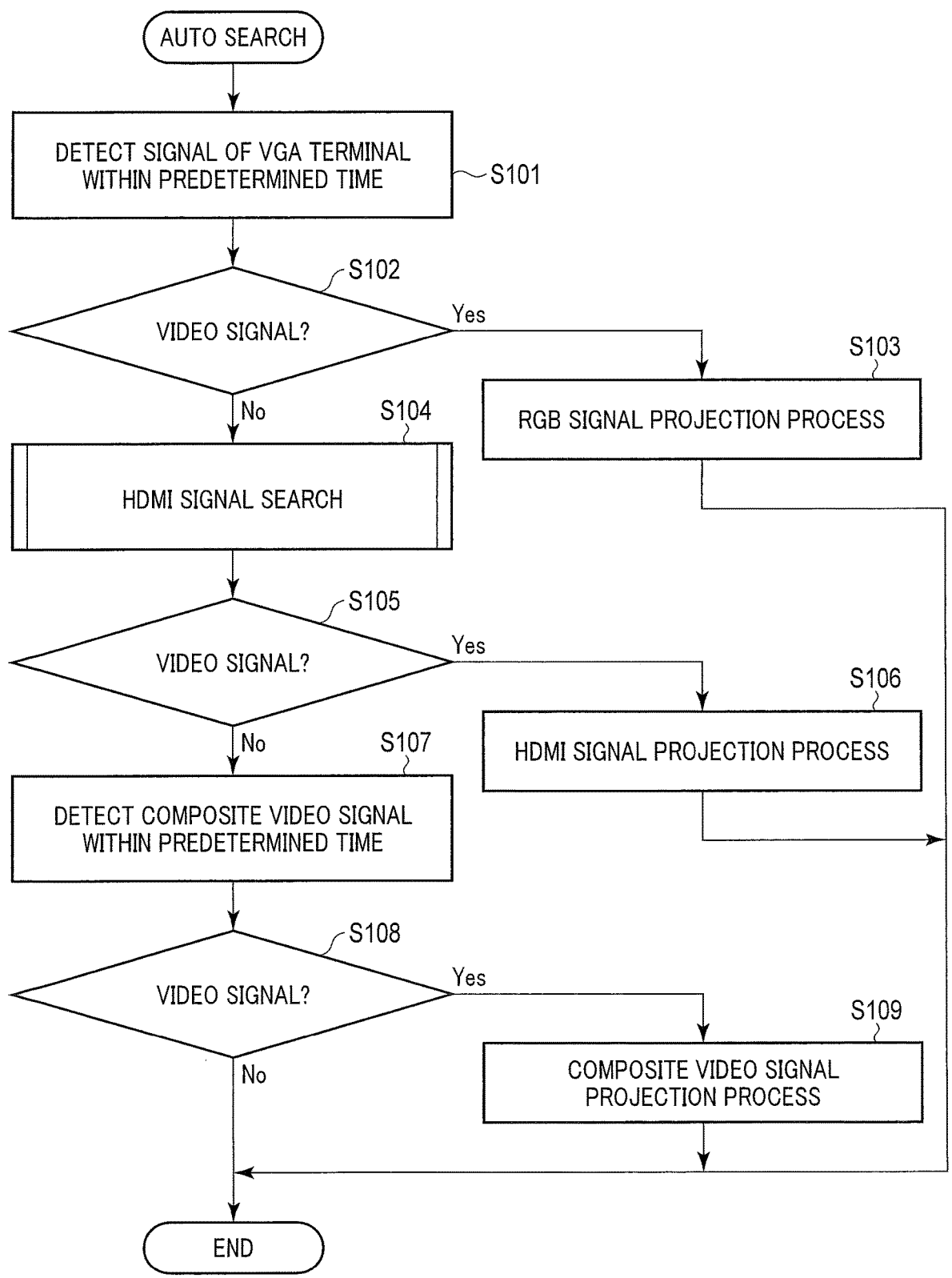
FIG. 3 is a flowchart illustrating a process content at a time of transitioning to a projection operation by detecting a video signal by an auto search function in the embodiment.

FIG. 3 is a flowchart illustrating a process content at a time of transitioning to a projection operation corresponding to an input video signal, after detecting, by an auto search function, a video signal which has been input at a time point of the start of projection.

To start with, the CPU 14 detects, within a predetermined time, whether an RGB signal is input to the VGA terminal via the A/D converter 12 (step S101).

As a result of the detection, the CPU 14 determines whether a video signal by the RGB signal is input (step S102).

When the CPU 14 determines that the video signal by the RGB signal is input (Yes in step S102), the CPU 14 executes a necessary setup process by assuming that projection by the RGB signal is to be executed (step S103). Then, the CPU 14 finishes the process of FIG. 3, and starts a projection operation as has been set up.

In step S102, when the CPU 14 determines that the video signal by the RGB signal is not input (No in step S102), the CPU 14 then determines whether an HDMI signal is input via the HDMI receiver 11, i.e., executes a search for an HDMI signal, within a variable set time which will be described below (step S104).

Figure 4:
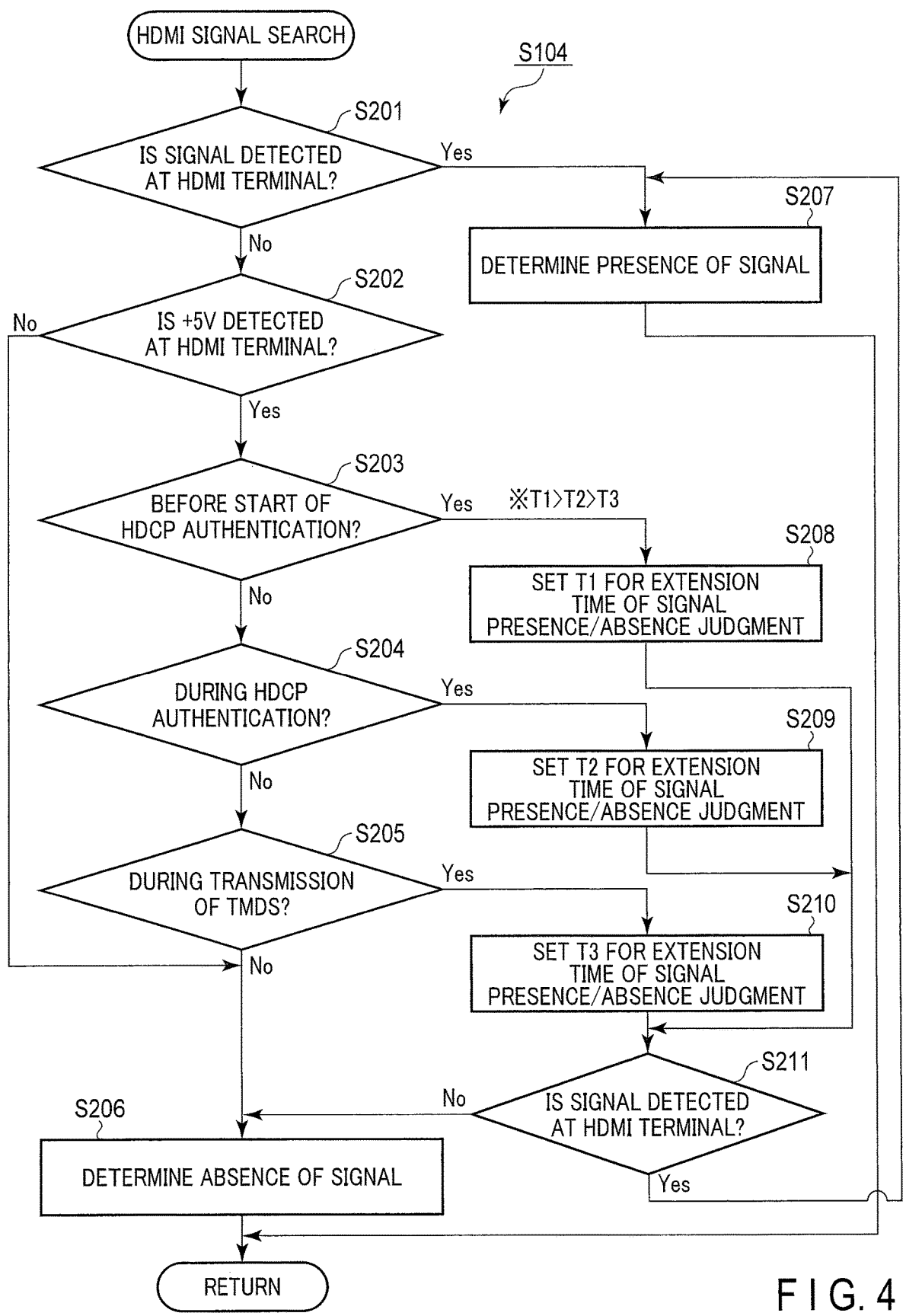
FIG. 4 is a flowchart illustrating the content of a subroutine of executing a setup process of a search time of an HDMI signal in step S104 of FIG. 3 in the embodiment.

FIG. 4 is a flowchart illustrating the content of a subroutine of executing a setup process of a search time of an HDMI signal in step S104.

To begin with, the CPU 14 determines whether a video signal has already been detected at the HDMI terminal by the HDMI receiver 11 (step S201).

When the CPU 14 determines that the video signal has already been detected at the HDMI terminal (Yes in step S201), the CPU 14 determines that a signal is input to the HDMI terminal (step S207). The CPU 14 assumes that the synchronization setup based on the HDMI signal is already executed with the device which is externally connected via the HDMI receiver 11, and finishes the process of FIG. 4.

On the other hand, in step S201, when the CPU 14 determines that the video signal has not yet been detected at the HDMI terminal (No in step S201), the CPU 14 then determines whether power of +5 [V] is supplied to a stipulated connect pin for power supply in the HDMI terminal, for example, an 18th pin in a type A socket, thereby determining whether a signal is input to the HDMI terminal (step S202).

When the CPU 14 determines that power of +5 [V] is not supplied to the stipulated connect pin for power supply in the HDMI terminal (No in step S202), the CPU 14 determines that no signal is input to the HDMI terminal (step S206). Assuming that the process of FIG. 4 is thus finished, the CPU 14 returns to the process of FIG. 3.

On the other hand, in step S202, when the CPU 14 determines that power of +5 [V] is supplied to the stipulated connect pin for power supply in the HDMI terminal (Yes in step S202), the CPU 14 then determines whether the present time is before the start of an authentication process of HDCP that is encryption technology of signals via a connection pin group for TMDS data (step S203).

When the CPU 14 determines that the present time is before the start of the authentication process of HDCP (Yes in step S203), the CPU 14 sets a relatively long extension time T1 for a standard search time for determining the presence/absence of the HDMI signal (step S208). Then, the CPU 14 determines whether a video signal is detected at the HDMI terminal by the HDMI receiver 11, during the time in which the extension time T1 is added to the standard search time (step S211).

In step S211, when the CPU 14 determines that the video signal is not detected at the HDMI terminal (No in step S211), the CPU 14 determines that no signal is input to the HDMI terminal (step S206). Assuming that the process of FIG. 4 is thus finished, the CPU 14 returns to the process of FIG. 3.

On the other hand, in step S211, when the CPU 14 determines that the video signal is detected at the HDMI terminal (Yes in step S211), the CPU 14 determines that a signal is input to the HDMI terminal (step S207). Assuming that that the process of FIG. 4 is thus finished, the CPU 14 returns to the process of FIG. 3.

In step S203, when the CPU 14 determines that the timing for starting the authentication process of HDCP has passed (No in step S203), the CPU 14 then determines whether the authentication process of HDCP has already been started and the authentication process is being executed (step S204).

When the CPU 14 determines that the authentication process of HDCP is being executed (Yes in step S204), the CPU 14 sets a slightly long extension time T2 (T2<T1) for the standard search time for determining the presence/absence of the HDMI signal (step S209). Then, the CPU 14 determines whether a video signal is detected at the HDMI terminal by the HDMI receiver 11, during the time in which the extension time T2 is added to the standard search time (step S211).

In step S211, when the CPU 14 determines that the video signal is not detected at the HDMI terminal (No in step S211), the CPU 14 determines that no signal is input to the HDMI terminal (step S206). Assuming that the process of FIG. 4 is thus finished, the CPU 14 returns to the process of FIG. 3.

In step S211, when the CPU 14 determines that the video signal is detected at the HDMI terminal (Yes in step S211), the CPU 14 determines that a signal is input to the HDMI terminal (step S207). Assuming that the process of FIG. 4 is thus finished, the CPU 14 returns to the process of FIG. 3.

In step S204, when the CPU 14 determines that the authentication process of HDCP is not being executed, either (No in step S204), the CPU 14 then determines whether the authentication process of HDCP was completed and TMDS data that is an actual video signal is being transmitted (step S205).

When the CPU 14 determines that the TMDS data is being transmitted (Yes in step S205), the CPU 14 sets a short extension time T3 (T3<T2<T1) for the standard search time for determining the presence/absence of the HDMI signal (step S210). Then, the CPU 14 determines whether a video signal is detected at the HDMI terminal by the HDMI receiver 11, during the time in which the extension time T3 is added to the standard search time (step S211).

In step S211, when the CPU 14 determines that the video signal is not detected at the HDMI terminal (No in step S211), the CPU 14 determines that no signal is input to the HDMI terminal (step S206). Assuming that the process of FIG. 4 is thus finished, the CPU 14 returns to the process of FIG. 3.

In step S211, when the CPU 14 determines that the video signal is detected at the HDMI terminal (Yes in step S211), the CPU 14 determines that a signal is input to the HDMI terminal (step S207). Assuming that the process of FIG. 4 is thus finished, the CPU 14 returns to the process of FIG. 3.

In step S205, when the CPU 14 determines that the TMDS data is not being transmitted, either (No in step S205), the CPU 14 determines that no signal is input to the HDMI terminal (step S206). Assuming that the process of FIG. 4 is thus finished, the CPU 14 returns to the process of FIG. 3.

In FIG. 3, the CPU 14 determines whether the video signal is input or not, based on the result of detection as to whether the video signal (TMDS data) by the HDMI signal is input or not, within the range of the extension time that is added in the process of FIG. 4, in addition to the standard search time for determining the presence/absence of the HDMI signal (step S105).

When the CPU 14 determines that the video signal by the HDMI signal is input (Yes in step S105), the CPU 14 executes a necessary setup process by assuming that projection by the HDMI signal is to be executed (step S106). Then, the CPU 14 finishes the process of FIG. 3, and starts a projection operation as has been set up.

On the other hand, in step S105, when the CPU 14 determines that the video signal by the HDMI signal is not input (No in step S105), the CPU 14 detects, within a preset time, whether a composite video signal is input via the video decoder 13 (step S107).

As a result of the detection, the CPU 14 determines whether a video signal by the composite video signal is input (step S108).

When the CPU 14 determines that the video signal by the composite video signal is input (Yes in step S108), the CPU 14 executes a necessary setup process by assuming that projection by the composite video signal is to be executed (step S109). Then, the CPU 14 finishes the auto search process of FIG. 3.

On the other hand, in step S108, when the CPU 14 determines that the video signal by the composite video signal is not input, either (No in step S108), the CPU 14 assumes that no video signal is input to the HDMI receiver 11, A/D converter 12 or video decoder 13, and then terminates the process of FIG. 3.

Figure 5:
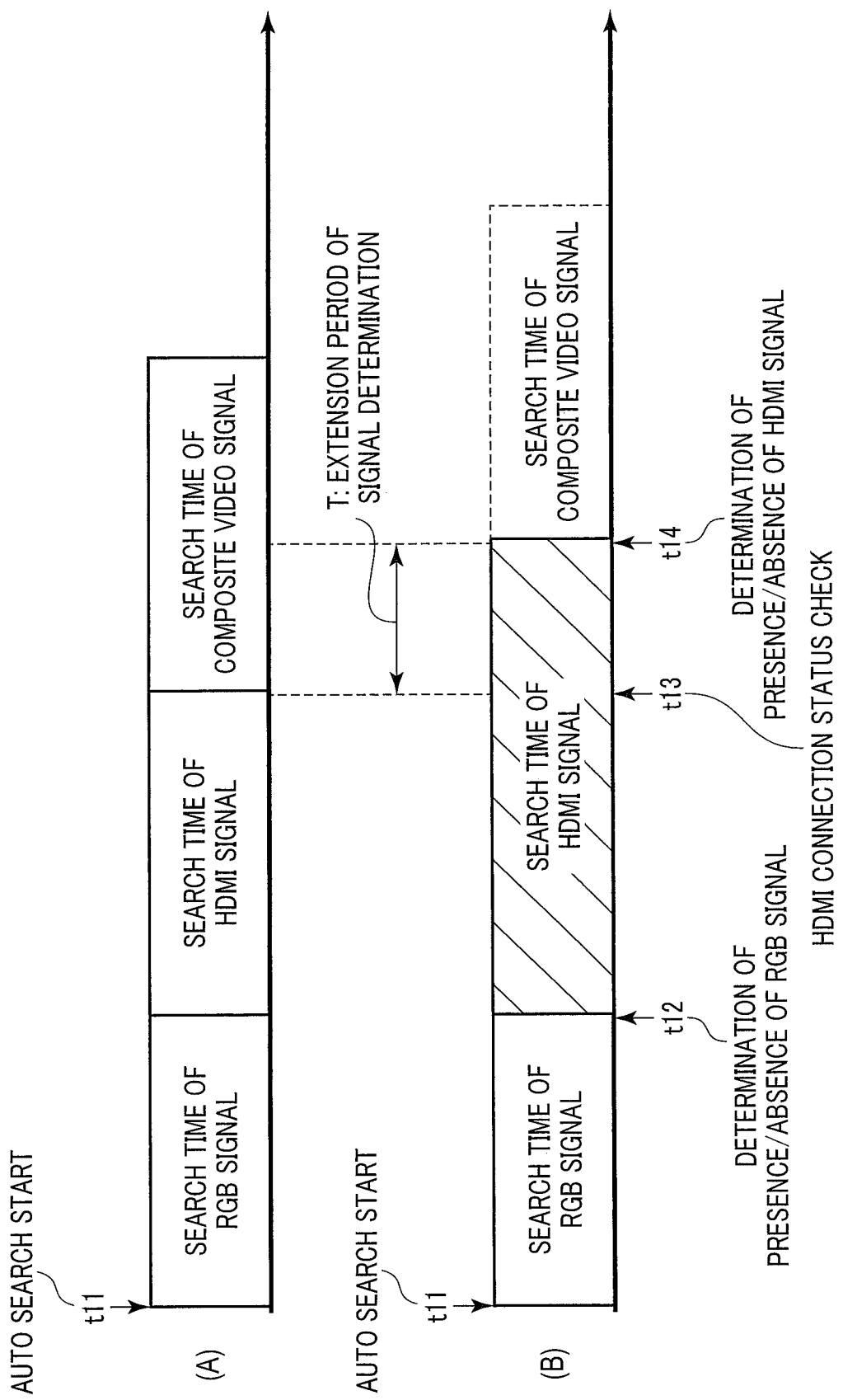
FIG. 5 is a view for explaining the search time of the HDMI signal in the embodiment.
Figure 6:
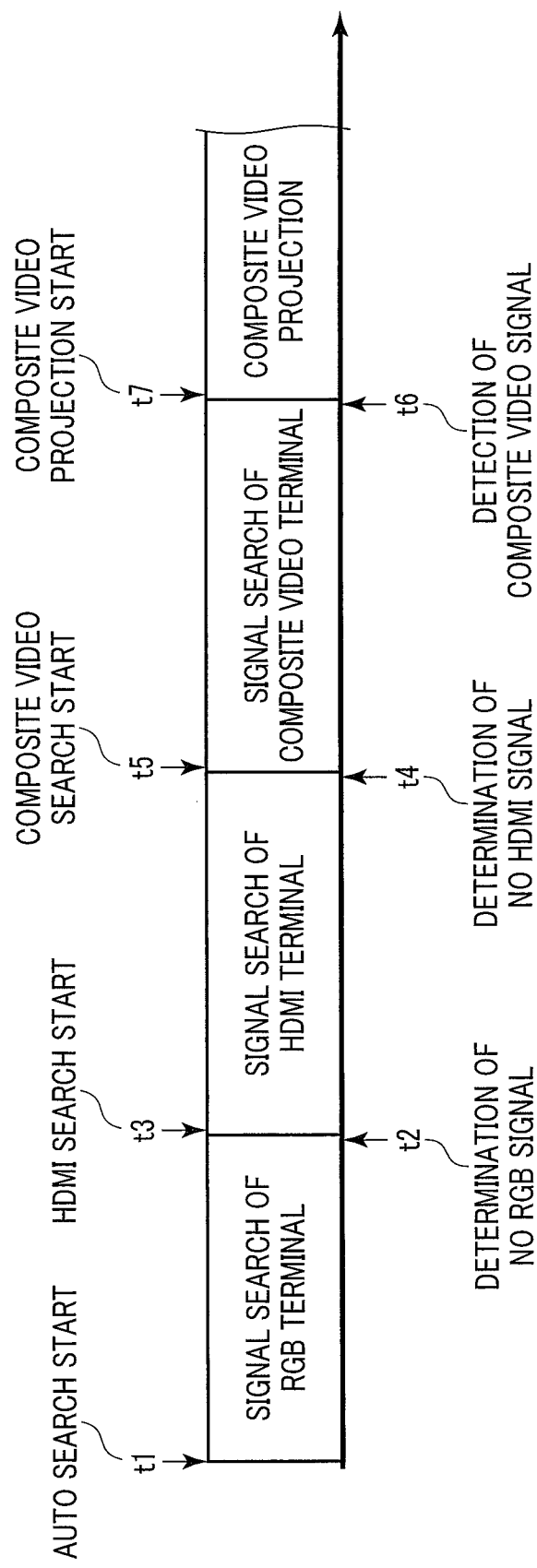
FIG. 6 is a view illustrating an example of a process at a time of executing an auto search function of a video signal.

Parts (A) and (B) of FIG. 5 are views for explaining the search time of the HDMI signal, the search time being extended as needed by the above-described process of FIG. 4.

Part (A) of FIG. 5 is a timing chart illustrating, for the reference purpose, a case of starting an auto search operation from timing t11, when the search time of an RGB signal, the search time of an HDMI signal and the search time of a composite video signal are fixed.

On the other hand, part (B) of FIG. 5 illustrates a case in which, in particular, the search time of the HDMI is extended as needed by the process of FIG. 4. At timing t11, the process of the auto search is started, and the search of the RGB signal is first executed.

At timing t12, the presence/absence of the RGB signal is determined. At a time point when the absence of the input of the RGB signal is determined, the search for the HDMI signal is then executed. In the process of this search, the connection status of the HDMI signal is determined by the end of a normal, standard search time indicated by timing t13 in FIG. 5. As illustrated in FIG. 4, the extension time T up to a timing t14 corresponding to the status is set such that the extension time T is the extension time T1 if the present time is before the start of the authentication of HDCP, the extension time T is the extension time T2 if the authentication of HDCP is being executed, and the extension time T is the extension time T3 if the TMDS data is being transferred (T1>T2>T3). Thereby, the setup of the input of the video signal corresponding to the HDMI signal can surely be executed within the extended time.

Note that, in part (B) of FIG. 5, the search time of the composite video signal after the search process of the HDMI is also described in association with part (A) of FIG. 5. However, actually, at the time point when the presence of the signal input was determined during the search process of the HDMI signal and the setup of the input for the HDMI signal was executed, the subsequent search process of the composite video signal is not executed.

In the above-described embodiment, in accordance with the authentication process stage of HDCP that is the copy guard function in HDMI, and the presence/absence of the process of TMDS, the controller sets up the extension of the search time relating to the HDMI signal that is the digital video signal, and varies the time widths for extension, respectively. However, the present invention is not limited to this configuration. Instead of extending the set time that is set in advance, the search time of the digital video signal may be set to become shorter in accordance with the authentication process stage of HDCP and the presence/absence of the process of TMDS.

As has been described above in detail, according to the present embodiment, it is possible to properly set a time for determining the presence/absence of each of a plurality of video signals at a time of executing a search for the video signals, including, in particular, a digital video signal whose processing time varies greatly in accordance with the status.

In particular, the search time is variably set in accordance with the authentication process stage of HDCP that is the copy guard function in HDMI, and the presence/absence of the process of TMDS. Thereby, the search time relating to the HDMI signal that is the digital video signal can properly be set.

In addition, the time width for extension is varied in accordance with the authentication process stage of HDCP and the presence/absence of the process of TMDS, respectively. Thereby, the necessary extension time can be set in accordance with the status.

In the above-described embodiment, the description was given of the case in which the invention is applied to the apparatus to which the HDMI signal is input as the digital video signal. However, in the present invention, the digital video signal is not limited to the HDMI signal, and examples of other digital signals using the HDCP as the technology for encrypting signals include DisplayPort, MHL, HDBaseT, WirelessHD, etc.

Moreover, the encryption technology for the copy guard is not limited to HDCP. The invention is similarly applicable when the encryption technology is DTCP (Digital Transmission Content Protection), CSS (Content Scramble System), AACS (Advanced Access Content System), etc.

Besides, the present invention is not limited to the above-described embodiment, and can be variously modified without departing from the scope of the present invention in practical stages. In addition, the embodiments may be appropriately combined as much as possible and practiced and, in this case, the combined advantageous effects can be obtained. Furthermore, the above-described embodiment incorporates inventions of various stages, and various inventions can be extracted by appropriate combinations of the disclosed constituent elements. For example, even if some constituent elements are omitted from all the constituent elements disclosed in the embodiment, a configuration from which some constituent elements are omitted can be extracted as an invention if the problem described in the specification can be solved and the advantageous effects described in the specification can be obtained.

What is claimed is:

1. A display apparatus comprising:
   an input device comprising a digital video signal terminal configured to receive input of a digital video signal, to be displayed by a display, from a source device; and
   a controller configured to:
      determine whether power supply to a power supply terminal of the digital video signal terminal is present;
      in response to determining that the power supply to the power supply terminal of the digital video signal terminal is present:
         determine a stage of a plurality of stages of a connection process between the source device and the display apparatus to be completed in series prior to receiving input of the digital video signal from the source device being executed; and
         set a search time of the digital video signal from amongst a plurality of search times,
            wherein each of the plurality of search times is one of a plurality of extension times added to a standard search time, and
            wherein the one of the plurality of extension times is selected in accordance with the stage of the connection process determined; and
      execute a search of the digital video signal in the search time set.

2. The display apparatus of claim 1,
   wherein each stage of the plurality of stages includes transmission and reception of a different signal via the digital video signal terminal, and
   wherein in setting the search time of the digital video signal, the controller is configured to:
      set the search time to be a first predetermined search time in accordance with determining that a first stage of the plurality of stages is being executed; and
      set the search time to be a second predetermined search time shorter than the first predetermined search time in accordance with determining that a second stage that is executed in series after the first stage of the plurality of stages is being executed.

3. The display apparatus of claim 2,
   wherein the plurality of stages comprises:
      a stage before performing an authentication process of a copy guard;
      a stage of performing the authentication process of the copy guard; and
      a stage of determining presence or absence of an input of the digital video signal, executed in series in the recited order.

4. A display control method for controlling a display apparatus comprising an input device comprising a digital video signal terminal configured to receive input of a digital video signal, to be displayed by a display, from a source device, the display control method comprising:
   determining whether power supply to a power supply terminal of the digital video signal terminal is present;
   in response to determining that that the power supply to the power supply terminal of the digital video signal terminal is present:
      determining a stage of a plurality of stages of a connection process between the source device and the display apparatus to be completed in series prior to receiving input of the digital video signal from the source device being executed; and
      setting a search time of the digital video signal from amongst a plurality of search times,
         wherein each of the plurality of search times is one of a plurality of extension times added to a standard search time, and
         wherein the one of the plurality of extension times is selected in accordance with the stage of the connection process determined; and
   executing a search of the digital video signal in the search time set.

5. The display control method according to claim 4,
   wherein each stage of the plurality of stages includes transmission and reception of a different signal via the digital video signal terminal, and
   wherein setting the search time of the digital video signal comprises:
      setting the search time to be a first predetermined search time in accordance with determining that a first stage of the plurality of stages is being executed; and
      setting the search time to be a second predetermined search time shorter than the first predetermined search time in accordance with determining that a second stage that is executed in series after the first stage of the plurality of stages is being executed.

6. The display control method according to claim 5,
   wherein the plurality of stages comprises:
      a stage before performing an authentication process of a copy guard;
      a stage of performing the authentication process of the copy guard; and
      a stage of determining presence or absence of an input of the digital video signal, executed in series in the recited order.

7. A non-transitory computer-readable storage medium having a program stored thereon for controlling a display apparatus comprising a digital video signal terminal configured to receive input of a digital video signal, to be displayed by a display, from a source device, wherein the program causes a computer to at least perform:
   determining whether power supply to a power supply terminal of the digital video signal terminal is present;
   in response to determining that that the power supply to the power supply terminal of the digital video signal terminal is present:

determining a stage of a plurality of stages of a connection process between the source device and the display apparatus to be completed in series prior to receiving input of the digital video signal from the source device being executed; and setting a search time of the digital video signal from amongst a plurality of search times,
- wherein each of the plurality of search times is one of a plurality of extension times added to a standard search time, and
- wherein the one of the plurality of extension times is selected in accordance with the stage of the connection process determined; and executing a search of the digital video signal in the search time set.

8. The non-transitory computer-readable storage medium according to claim 7,
- wherein each stage of the plurality of stages includes transmission and reception of a different signal via the digital video signal terminal, and
- wherein setting the search time of the digital video signal comprises:
  - setting the search time to be a first predetermined search time in accordance with determining that a first stage of the plurality of stages is being executed; and
  - setting the search time to be a second predetermined search time shorter than the first predetermined search time in accordance with determining that a second stage that is executed in series after the first stage of the plurality of stages is being executed.

9. The non-transitory computer-readable storage medium according to claim 8,
- wherein the plurality of stages comprises:
  - a stage before performing an authentication process of a copy guard;
  - a stage of performing the authentication process of the copy guard; and
  - a stage of determining presence or absence of an input of the digital video signal, executed in series in the recited order.

* * * * *